United States Patent [19]

Johnson

[11] Patent Number: 4,775,214

[45] Date of Patent: Oct. 4, 1988

[54] WAVELENGTH CODED RESONANT OPTICAL SENSOR

[75] Inventor: Lawrence A. Johnson, Plymouth, Minn.

[73] Assignee: Rosemount Inc., Eden Prairie, Minn.

[21] Appl. No.: 914,561

[22] Filed: Oct. 1, 1986

Related U.S. Application Data

[63] Continuation of Ser. No. 563,875, Dec. 21, 1983, abandoned.

[51] Int. Cl.[4] ............ G02B 6/02; H01J 5/16; G01L 1/24
[52] U.S. Cl. .............. 350/96.29; 350/96.11; 350/96.12; 350/96.15; 350/96.30; 350/371; 250/227; 250/231 P; 73/800
[58] Field of Search .............. 350/96.10, 96.11, 96.15, 350/96.12, 96.16, 96.13, 96.29, 96.14, 96.30, 370, 371, 380, 381, 382, 384, 385; 250/227, 231 R, 231 P; 73/800

[56] References Cited

U.S. PATENT DOCUMENTS

| | | | |
|---|---|---|---|
| 3,558,213 | 1/1971 | Marcatili | 350/96.12 |
| 3,743,962 | 7/1973 | Rosenberg | 350/96.12 |
| 4,054,363 | 10/1977 | Suematsu | 350/96.11 |
| 4,269,506 | 5/1981 | Johnson et al. | 73/800 X |
| 4,436,422 | 3/1984 | Schiffner | 356/349 |
| 4,442,350 | 4/1984 | Rashleigh | 250/227 |
| 4,454,418 | 6/1984 | Walker | 250/227 |
| 4,577,100 | 3/1986 | Meltz et al. | 350/96.29 X |
| 4,630,885 | 12/1986 | Haavisto | 350/96.15 |
| 4,695,121 | 9/1987 | Mahapatra et al. | 350/96.12 |
| 4,707,061 | 11/1987 | McMahon | 350/96.16 |
| 4,725,728 | 2/1988 | Brininstool et al. | 250/227 |

FOREIGN PATENT DOCUMENTS 55-103509  8/1980  Japan ............ 350/96.15

OTHER PUBLICATIONS

Haavisto et al., "Resonance Effects in Low-Loss Ring Waveguides", Optics Lett. vol. 5, No. 12, 12/80 pp. 510-512.
Walker, "Photoelastic and Electro-Optic Sensors" Pro. of the SPIE Fiber Optic and Laser Sensors vol. 412 (1983) pp. 1-8.
Thomas G. Giallorenzi et al., "Optical Fiber Sensor Technology", IEEE J. Quantum Electronics, v. QE-18, 626 (Apr. 1982).
Christopher M. Lawson and V. J. Tekippe "Fiber-Optic Diaphragm-Curvature Pressure Transducer", Opt. Lett., v. 8, 286 (May 1983).
Steinar Stueflotten, "Low Temperature Excess Loss of Loose Tube Fiber Cables", Appl. Opt., 21, 4300 (Dec. 1, 82).
W. W. Morey et al., "Design, Fabrication and Testing of an Optical Temperature Sensor", NASA CR-165125, Jul. 1980.

(List continued on next page.)

Primary Examiner—William L. Sikes
Assistant Examiner—Brian M. Healy
Attorney, Agent, or Firm—Kinney & Lange

[57] ABSTRACT

An optical sensor for providing an output signal representative of a sensed parameter such as pressure or temperature which includes an input/output optical waveguide and an optical resonator. The input/output waveguide is coupled to the resonator so that a significant change in light intensity at the output of the input-/output waveguide occurs at resonance of the optical resonator. The optical resonator exhibits first and second independent resonant modes which differ from one another as a function of the parameter to be sensed. A narrow bandwidth variable frequency light source provides a frequency swept light beam to the input/output waveguide, and one or more photodetectors sense the intensity of the light beam at the output of the input-/output waveguide to produce an output signal representative of the parameter based upon the time difference between occurrence of the first and second resonant modes.

53 Claims, 8 Drawing Sheets

OTHER PUBLICATIONS

Kazuo Kyuma et al., "Development of Fiber Optic Sensing Systems – A Review", Optics and Lasers in Engineering, V. 3, 155 (1982).

W. B. Spillman, Jr. and D. H. McMahon, "Multimode Fiber Optic Sensors Based on Photoelastic Effect", Apr. 1983.

W. B. Spillman, Jr. and D. H. McMahon, "Multimode Fiber-Optic Hyrophone Based on the Photoelastic Effect", Appl. Opt. 22, 1029 (Apr. 1, 83).

A. L. Harmer, "Principles of Optical Fiber Sensors and Instrumentation", in Optical Sensors and Optical Techniques in Instrumentation Symposium Proceedings, Institute of Measurement and Control, London 1981.

K. A. James et al., Control Engineering, 30 (Feb. 1979).

S. L. Chen and J. T. Boyd, "Temperature-independent Thin Film Optical Waveguide" Appln. Opt., 20, 2280, (Jul. 1, 1981).

S. Timoshenko and S. Woinowsky-Krieger, Theory of Plates and Shells, McGraw-Hill, New York (1959).

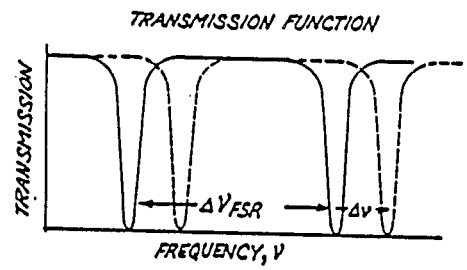
Fig. 4
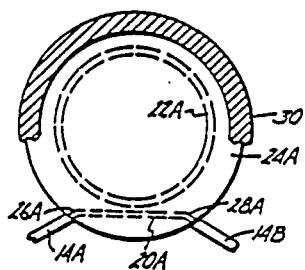
Fig. 5
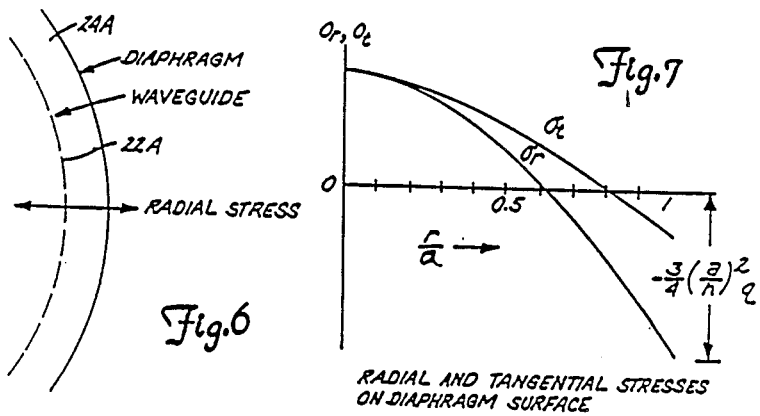
Fig. 6
Fig. 7
RADIAL AND TANGENTIAL STRESSES ON DIAPHRAGM SURFACE

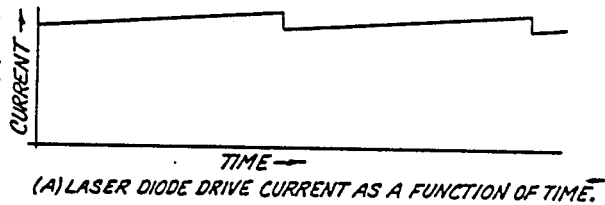
(A) LASER DIODE DRIVE CURRENT AS A FUNCTION OF TIME.
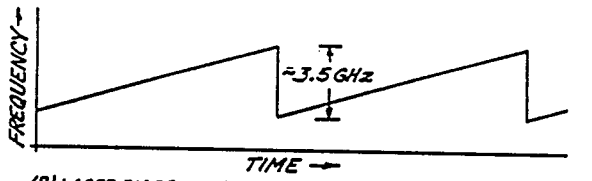
(B) LASER DIODE OUTPUT FREQUENCY AS A FUNCTION OF TIME.
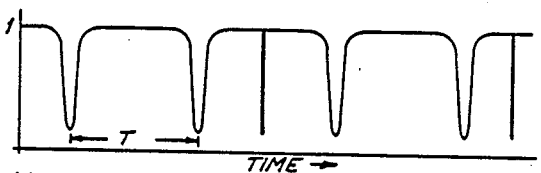
(C) OUTPUT FROM THE REFERENCE RESONATOR MODE AS A FUNCTION OF TIME.
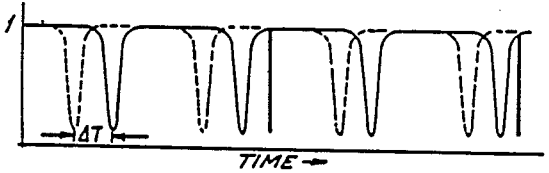
(D) OUTPUT FROM THE SENSING RESONATOR MODE SHOWING THE EFFECT OF A PRESSURE INDUCED SHIFT IN THE RESONANT FREQUENCY

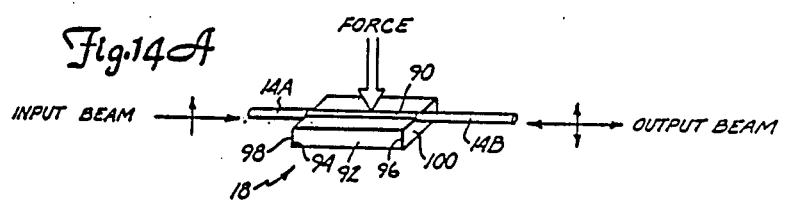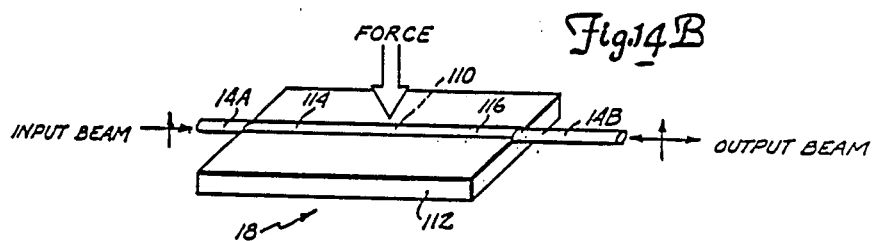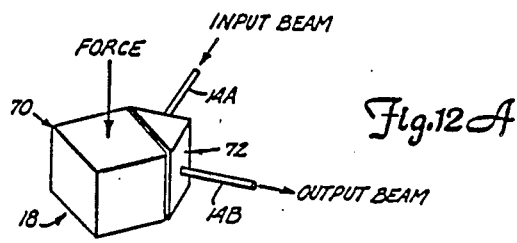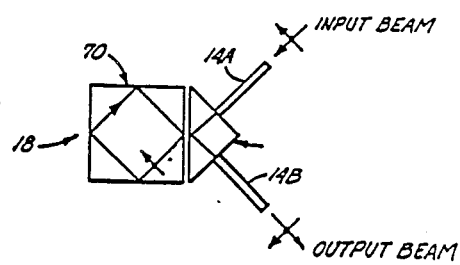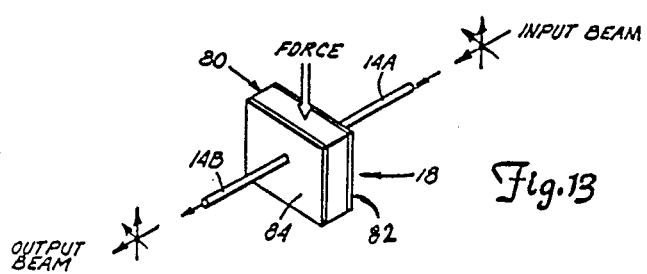

WAVELENGTH CODED RESONANT OPTICAL SENSOR

This is a continuation of application Ser. No. 563,875, filed Dec. 21, 1983 (now abandoned).

BACKGROUND OF THE INVENTION

1. Field of the Invention

The present invention relates to electro-optical devices. In particular, the present invention relates to an optical sensor which provides an output signal as a function of a sensed parameter such as pressure, temperature, force, acceleration or vibration.

2. Description of the Prior Art

Currently there is considerable interest in applying electro-optical techniques to sensor applications. Passive optical sensors offer the possibility of safe, accurate operation in explosive and high temperature environments and are inherently immune to EMI and EMP threats. These advantages combine to make optically based sensors attractive for a number of applications.

A wide variety of optical sensing techniques have been suggested for measuring physical parameters. (See for example Thomas G. Giallorenzi, et al "Optical Fiber Sensor Technology", *IEEE J. Quantum Electronics,* V. QE-18, 626, (April 1982); Christopher M. Lawson and V. J. Tekippe "Fiber-Optic Diaphragm-Curvature Pressure Transducer", *Opt. Lett.,* V.8, 286 (May 1983)). These techniques include fiber Mach-Zender interferometry, Fabry-Perot interferometry, polarization effects, and displacement based techniques such as fiber microbending, evanescent coupling, Moire grating, butt-coupling, near total internal reflection (TIR) and optical curvature sensing of a deflected diaphragm. When implemented in a remote, passive sensor head these techniques all rely on changes in the intensity of returned light to convey information. Although this approach is the simplest conceptually, it is unlikely that sensors based on intensity transmitted information are capable of fulfilling the requirements of high accuracy and reliability in actual use.

In the simplest intensity based sensors, variations in the transmission losses through cabling and connectors are indistinguishable from variations due to changes in the sensed parameter. Connect/disconnect cycling of multimode fiber optic connectors produce loss variations ranging from 0.1 db (2.3%) for the best ruggedized military connectors to 0.5 db (11%) for commercial connectors. Temperature cycling of fiber optic cables produces even larger variations often amounting to several db for lengths of tens of meters (see for example Steinar Stueflotten, "Low Temperature Excess Loss of Loose Tube Fiber Cables", *Appl. Opt.* 21, 4300 (1 Dec. 82)). These uncontrollable transmission variations make it virtually impossible to produce high accuracy sensors based on simple intensity modulation.

Some attempts have been made to overcome the limitations of simple intensity based optical sensors. In one approach, signals at two different wavelengths are transmitted through the same fiber. At the sensor head the intensity at only one of the wavelengths is modulated, leaving the other wavelength to provide a reference signal (W. W. Morey, et al "Design, Fabrication and Testing of an Optical Temperature Sensor", *NASA CR*-165125, July 1980; Kazuo Kyuma, et al, "Development of Fiber Optic Sensing Systems—A Review", *Optics and Lasers in Engineering,* V. 3, 155 (1982)). In another approach the sensor produces two output signals that are complementary to one another (W. B. Spillman, Jr. and D. H. McMahon, "Multimode Fiber Optic Sensors Based on the Photoelastic Effect", presented at the SPIE Technical Symposium East '83, April 1983; W. B. Spillman, Jr. and D. H. McMahon, "Multimode Fiber-Optic Hydrophone Based on the Photoelastic Effect", *Appl. Opt.,* 22, 1029 (1 April 83)). Unfortunately, neither of these approaches appears to offer the capability of fulfilling the requirements for high accuracy since connector and cable losses are wavelength dependent and can differ even for two fibers within a common cable.

From the above examples it is clear that the method by which measurement information is transmitted is at least as important as the method used to convert the sensed parameter to an optical parameter. In all of the approaches described above, information is transmitted as an intensity level. It has been suggested in the past that other approaches to information transmission in optical sensing are also possible (see for example A. L. Harmer, "Principles of Optical Fiber Sensors and Instrumentation", in Optical Sensors and Optical Techniques in Instrumentation Symposium proceedings, Institute of Measurement and Control, London 1981). One proposed approach to optical sensing of temperature which does not rely on intensity coding uses wavelength coding of temperature information (K. A. James et al, *Control Engineering,* 30 (February 1979)). The sensor proposed by James et al is based on a Fabry-Perot etalon with variable separation. As the temperature of the etalon spacer changes, the plate separation changes, which shifts the wavelengths of peak etalon transmission. The wavelengths of peak transmission are read out using an optically broadband source as input while the output is spectrally analyzed using a prism disperser and photodiode array. Although this sensor avoids the disadvantages of intensity coded sensors, it is relatively difficult to fabricate and requires complex signal analysis.

SUMMARY OF THE INVENTION

The present invention is an optical sensor which provides an output signal representative of a sensed parameter. The optical sensor of the present invention includes an optical waveguide means and an optical resonator means which are optically coupled to one another. The optical resonator means exhibits resonance modes at first and second sets of resonant frequencies which change differently with changes in the sensed parameter.

A narrow bandwidth, variable frequency light beam is supplied to an input of the optical waveguide means. The frequency of the light beam varies with time through a frequency range which includes at least one resonant frequency of each mode of the optical resonator. When the frequency of the light beam is equal to a resonant frequency of one of the resonant modes of the optical resonator means, the intensity of the light beam at the output of the optical waveguide means reaches an extremum (minimum or maximum). Means responsive to the light beam from the output of the optical waveguide means provides the output signal as a function of the differences in resonant frequencies of the resonant modes of the optical resonator means.

In one embodiment, the optical resonator means is an optical ring resonator, solid cube resonator, Fabry-Perot etalon resonator or integrated optic linear resonator which is responsive to a parameter such as pressure, force or temperature. In this embodiment, the two resonant modes of the optical resonator means are excited by the input light beam which has two different polarization components. At the output of the waveguide means, optical detectors monitor the intensity of the light beams independently for the two polarization components. In this embodiment, the effective index of refraction for the first polarization changes differently than the effective index of refraction for the second polarization as a function of the sensed parameter. As a result, the difference in resonant frequencies of the first and second resonant modes changes as a function of the sensed parameter. As the frequency of the light beam is swept through the free spectral range of the optical resonator means, resonance occurs for one polarization component and then the other.

The time interval between occurrence of the resonances in the two polarization components is directly proportional to the sensed parameter. Since the sensed parameter is proportional to a time interval, rather than an intensity level, the optical sensor is essentially immune to connector and cable loss variation. This permits high accuracy operation of the optical sensor even in adverse environments.

In another embodiment in which the sensed parameter is temperature, the optical ring resonator means includes first and second optical resonators of different size formed in a common substrate. The first ring resonator exhibits resonances at a first set of resonant frequencies which changes with temperature, while the second ring resonator exhibits resonances at a second set of resonant frequencies which changes differently with temperature. Since the ring resonators have slightly different perimeters, the separation between resonant frequencies of the first and second sets will change with temperature. This allows determination of absolute temperature by determining the difference between the first and second resonant frequencies. As the frequency of the light beam is swept through a spectral range which includes resonant frequencies of both the first and second resonant modes, the light beam output decreases in intensity on at least two different occasions. The time interval between the occurrence of the first and second resonant frequencies is proportional to absolute temperature.

BRIEF DESCRIPTION OF THE DRAWINGS

FIG. 4 is a graph showing resonant characteristics of a ring resonator as a function of optical frequency.

FIG. 5 is a sectional top view, partially broken away, which illustrates one preferred embodiment of a diaphragm, support, ring resonator and input/output waveguide of a pressure sensing optical sensor of the present invention.

FIG. 6 is a diagram illustrating radial stress on the diaphragm of FIG. 5.

FIG. 7 is a graph illustrating tangential and radial stress on the bottom side of a clamped edge diaphragm.

FIGS. 11A–11D illustrate laser diode drive current, laser diode output frequency, output from the reference resonator mode, and output from the sensing resonator mode, respectively, as a function of time for a preferred embodiment of the pressure sensing optical sensor of FIG. 10.

FIGS. 12A and 12B are perspective and top views of a parameter sensing optical cube resonator.

FIG. 13 is a perspective view of a parameter sensing solid plate etalon resonator.

FIGS. 14A and 14B are perspective views showing two embodiments of parameter sensing integrated optic linear resonators.

DETAILED DESCRIPTION OF THE PREFERRED EMBODIMENTS

General Principles

Figure 1:
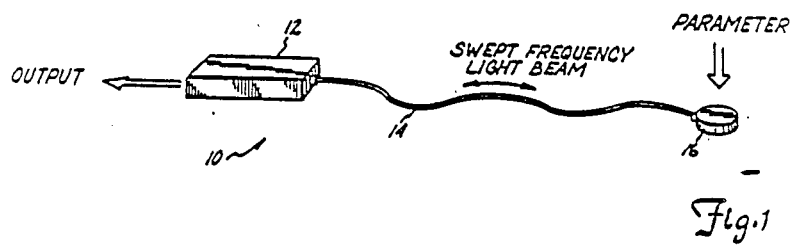
FIG. 1 is a schematic diagram illustrating one configuration of the wavelength coded resonant optical sensor of the present invention.

FIG. 1 shows, in schematic form, an embodiment of a wavelength coded resonant optical sensor 10 of the present invention. Light source/detector 12 provides a narrow bandwidth swept frequency light beam over fiber cable 14 to optical sensor head 16. Optical sensor head 16 includes an optical resonator sensing device 18 (shown in various preferred embodiments in FIGS. 2, 12A and 12B, 13 and 14) which interacts with a parameter to be sensed. Sensing device 18 exhibits two independent resonant modes at first and second sets of optical resonant frequencies which vary in different manners as the parameter changes. Each time the swept frequency light beam has a frequency corresponding to a resonant condition of one of the two modes, an extremum (i.e. maximum or minimum) in intensity of the light beam occurs.

Light source/detector 12 receives the swept frequency light beam which is returned from optical sensor head 16 through fiber cable 14. A substantial change in the intensity of the swept frequency light beam received by light source/detector 12 indicates the occurrence of resonance of one of the first and second resonant modes. Light source/detector 12 includes processing circuitry which provides an output representative of the parameter as a function of the difference between the occurrence of resonances in the first and second resonant modes.

The present invention, therefore, is based upon changes in two sets of resonant frequencies in an optical resonant cavity which are induced by a parameter such as pressure, temperature, force, acceleration or vibration. In the following description of the present invention, preferred embodiments of the present invention used for sensing pressure and for sensing temperature will be described in detail. Other preferred embodiments of the present invention are also summarized briefly. It will be clear, however, that the present invention is equally applicable to the sensing of other parameters and to sensing the rate of change of temperature, pressure and other parameters.

Figure 2:
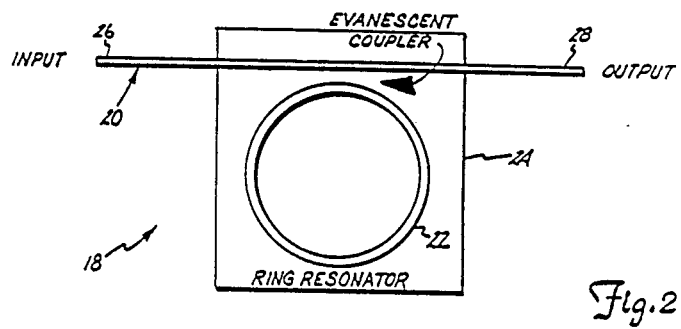
FIG. 2 is a schematic diagram of a parameter sensing ring resonator device for use in the optical sensor of FIG. 1.

FIG. 2 shows optical resonator sensing device 18, which includes input/output waveguide 20 and optical ring resonator 22. In the particular embodiment shown in FIG. 2, input/output waveguide 20 is a fiber optic waveguide, and optical ring resonator 22 is an integrated optic waveguide formed in or deposited on substrate 24.

In other embodiments of the present invention, input/output waveguide 20 is an integrated optic waveguide which is formed in or on substrate 24. In those embodiments, fiber optic waveguides are connected to the input and the output ends of input/output waveguide 20.

Input/output waveguide 20 receives the swept frequency light beam at its input end 26 and guides the light beam to its output end 28. Optical ring resonator 22 is evanescently coupled to input/output waveguide 20, and acts as a narrow band absorption filter to absorb the swept frequency light beam when the light beam has a frequency equal to a resonant frequency of optical ring resonator 22.

The resonance condition occurs when the circumference optical path of optical ring resonator 22 is an integer number of wavelengths. This condition can be expressed as:

$$m2\pi = Nkp \quad \text{Eq. 1}$$

where m is an integer, N is the effective waveguide index of refraction, k is the wave propagation constant $2\pi/\lambda$, and p is the circumference length of the resonator. The terms of the resonant frequencies of the cavity the above expression becomes:

$$v = mc/Np \quad \text{Eq. 2}$$

where c is the velocity of light. The order number of the resonance may vary widely depending on the application and is often as high as $10^4$. In practice, resonances of approximately the same order number are indistinguishable from one another. The free spectral range (frequency separation of adjacent resonances) is:

$$\Delta v_{FSR} = c/NP \quad \text{Eq 3}$$

At resonance, optical resonator 22 absorbs nearly all of the energy from the input/output waveguide 20, thus effectively acting as a narrowband absorption filter. The Q of the resonance in an optical resonant cavity is usually stated in terms of "finesse". Finesse depends on losses from the ring resonator including coupling losses and waveguide losses. In the case of the integrated optic ring resonator reported by Hasvisto and Pajer, "Resonance Effects in Low-Loss Ring Waveguides," Opt. Lett 5, 510 (December 1980). a finesse of sixteen was achieved. The finesse F and efficiency $\eta$ of optical ring resonator 22 are given by:

$$F = -\pi/\ln [\gamma \cos (KS)] \quad \text{Eq. 4}$$

$$\eta = 1 - [(\cos (KS) - \gamma)/(1 - \gamma \cos (KS))]^2 \quad \text{Eq. 5}$$

where $\gamma$ is the single pass transmission of the ring waveguide due to waveguide losses only. Stated in terms of db of loss per pass, $\Gamma$, we have:

$$\gamma = 10^{-\Gamma/10} \quad \text{Eq. 6}$$

The parameter COS (KS) is a measure of coupling efficiency between input/output waveguide 20 and optical ring resonator 22 with COS (KS)=1 corresponding to no coupling and COS (KS)=0 corresponding to complete coupling. The parameter K is a coupling coefficient and S is the interaction length.

Figure 3:
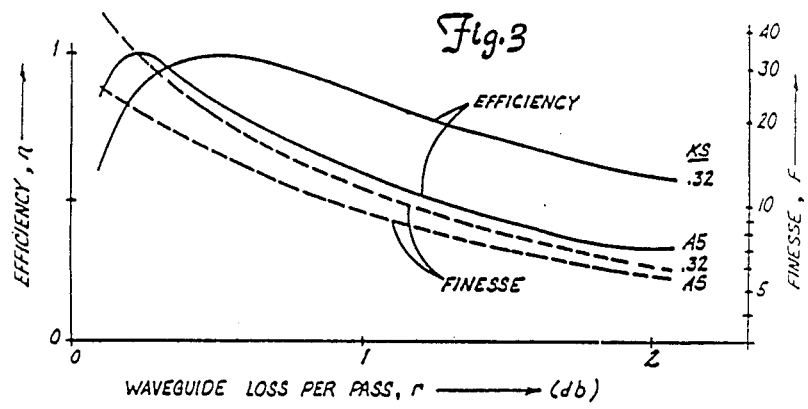
FIG. 3 is a graph of ring resonator finesse and efficiency as a function of single pass waveguide loss for two different values of coupling.

The finesse of the resonance is a measure of its sharpness and is equal to the ratio of the width of resonance to the separation of adjacent resonances $\Delta v_{FSR}$. The efficiency is a measure of the ability of the resonator to extract energy from input/output waveguide 20 at resonance. An efficiency of unity means that all of the light in input/output waveguide 20 is absorbed whereas a value of zero means that none of it is absorbed. Values of finesse and efficiency as a function of waveguide loss are shown graphically in FIG. 3. An important feature to note in FIG. 3 is that relatively large variations in coupling KS can be tolerated with little effect on the performance of optical ring resonator 22. FIG. 4 shows the resonator behavior of optical ring resonator 22 as a function of optical frequency.

The change in the resonance frequency of the resonator due to changes in the path circumference or index of refraction is derived from Equation 2 and is found to be:

$$\Delta v = -c/\lambda[(\Delta p/p) + (\Delta N/N)]. \quad \text{Eq 7}$$

To get a feeling for the meaning of Equation 7 consider a ring resonator which is 2 cm in diameter and has an effective index of refraction of 1.45. The free spectral range of this resonator is about 3.3 GHZ. In terms of wavelength this works out to a wavelength separation of about 0.008 nm assuming a nominal wavelength of 830 nm. From Equation 7 it is is found that the resonance frequencies of the resonator can be shifted the full 3.3 GHZ by a change in perimeter or index of refraction of 9 ppm. Changes of this order of magnitude are easily obtained, for example, through the elastic and photoelastic properties of optical materials.

Other forms of optical resonators (such as solid cube resonators, solid plate etalon resonators, and integrated optic linear resonators) exhibit similar resonance characteristics which are highly sensitive to changes in path length and index of refraction. The present invention takes advantage of these characteristics of high finesse optical resonators to sense a parameter such as pressure, temperature, force, acceleration or vibration which affects either an index of refraction or path length, or both.

Pressure Sensors

The high sensitivity of a high finesse optical resonator to physical changes can be exploited to make a rugged, high accuracy pressure sensor. In each sensor configuration described in this section, the sensing device is a type of optical resonator of high finesse which supports two independent resonant polarization modes (e.g. one being vertically polarized and the other being horizontally polarized). The resonator is constructed in such a way that the parameter to be sensed (e.g. pressure, force, temperature) causes the resonant frequency of one of the polarization modes to shift in frequency relative to the other polarization mode. The difference in resonant frequencies is read out and used to determine the magnitude of the parameter being sensed.

The resonant frequencies of the two polarization modes are read out by using a tuneable narrow band light source. The bandwidth (spectral purity) of the light source should be narrower than the band pass of the optical resonator. By sweeping the frequency of the light source linearly in time the optical resonances result in pulses at the output of detectors which sense intensity of the two polarization components of the light beam. The time interval between the pulses due to the different polarization modes is proportional to their frequency separation which is in turn related to the parameter being sensed.

Each polarization mode has multiple resonances. These resonances are separated in frequency by the "free spectral range" of the resonator—denoted $\Delta \gamma_{FSR}$. Because the availability of these resonances over a broad range of frequencies, the exact nominal operating frequency of the light source is unimportant. It is only important that the frequency sweep of the source be linear and preferably extend at least over the full free spectral range of the resonator.

The free spectral range of the resonator also imposes an upper limit on the range of the sensed parameter—a frequency shift of $(0.1)\ \Delta\nu_{FSR}$ is indistinguishable from a frequency shift of $(1.1)\ \Delta\nu_{FSR}$ due to the ambiguity introduced by the presence of multiple resonances.

The advantage of this optical sensing technique over other optical sensing techniques is that the information is wavelength coded (as opposed to intensity coded) and is therefore immune to intensity fluctuations of the source or loss variations in fiber optic cables or connectors used to transmit light to and from the optical resonator.

In the embodiment shown in FIG. 5, optical optical ring resonator 22A is fabricated as a channel optical waveguide on the bottom side of a substrate (diaphragm 24A), which is a fused silica clamped edge diaphragm mounted in support housing 30. Other diaphragm materials are also possible as long as they have appropriate mechanical and optical properties. As pressure is applied, surface stress (as shown in FIG. 6) induces a change in the effective index of refraction for light polarized in the plane (TE) of the diaphragm 24A compared to that for light polarized perpendicular to the plane (TM) of the diaphragm 24A. By using these two polarization modes as the sensing signal and reference signal, respectively, an accurate pressure measurement is obtained. Although temperature changes will affect the resonance frequencies of the two modes, by proper design of the channel waveguides these effects can be made equal for the two modes (see S. L. Chen and J. T. Boyd, "Temperature-independent Thin Film Optical Waveguide" Appln. Opt., 20, 2280, (1 July 1981)) thereby automatically cancelling the net temperature effect.

For thin diaphrams, the surface stresses on the bottom of a clamped edge diaphragm are given by:

$$\sigma_r = (3q/8h^2)[a^2(1+u)-r^2(3+u)] \qquad \text{Eq 8}$$

$$\sigma_t = (3q/8h^2)[a^2(1+u)-r^2(1+3u)] \qquad \text{Eq 9}$$

where u is Poisson's ratio, a is the radius of the diaphragm, r is the radius to the point of interest, h is the diaphragm thickness and q is the applied pressure. These stresses are shown graphically in FIG. 7 (see for example, S. Timoshenko and S. Woinowsky-Krieger, *Theory of Plates and Shells*, McGraw-Hill, New York, (1959)). For thick diaphragms, Eqs. 8 and 9 are no longer exactly valid and must be modified using appropriate correction factors. For simplicity in the discussion that follows, Eqs. 8 and 9 will be used without correction factors. Calculated diaphragm thicknesses will be approximately correct and will convey the substance of the concept presented here. However, in actual practice diaphragm designs will have to take into account appropriate correction factors for Eqs. 8 and 9.

Surface stresses perpendicular to the plane of the diaphragm 24A are negligable compared to stresses parallel to the plane of the diaphragm for most diaphragm designs. As a result, light polarized perpendicular to the plane of the diaphragm (TM) is substantially unaffected compared to light polarized parallel to the plane of the diaphragm (TE). In applications where surface stresses perpendicular to the plane of the diaphragm are not negligable it is sufficient that they be only substantially different from those in the plane of the diaphragm to produce a usable effect.

From FIG. 7, it can be seen that the maximum stress is radial stress occurring at the edge of the diaphragm. By placing ring resonator 22A around the edge of the diaphragm 24A, stress induced birefringence in resonator 22A for light polarized in the plane of the diaphragm will be large. Using Equation 8 evaluated at the edge of diaphragm 24A and the definition of the stress-optic coefficient $C_1$, the change in index of refraction for light polarized in the plane (TE) of diaphragm 24A can be approximated:

$$\Delta N = 3a^2 C_1 q / 4h^2 \qquad \text{Eq. 10}$$

The shift in the resonant frequencies of the two polarization modes can now be calculated using Eqs. 7 and 10. Subtracting the frequency shift of the reference (TM) resonator mode from that of the sensing (TE) resonator mode gives the difference in the resonance frequencies of these two modes.

$$\Delta\nu_D = \Delta\nu_s - \Delta\nu_r = -3a^2 C_1 cq / 4\lambda N h^2 \qquad \text{Eq. 11}$$

where the subscript s refers to the sensing (TE) polarization mode and r refers to the reference (TM) polarization mode. Using the value of the stress optic coefficient for fused quartz ($2.32 \times 10^{-8}$ psi$^{-1}$) and a wavelength of 830 nm, this difference frequency becomes:

$$\Delta\nu_D = (4.34 \text{ MHz/psi}) q (a/h)^2 \qquad \text{Eq. 12}$$

where again a is the diaphragm radius, h is the diaphragm thickness and q is the applied pressure.

Figure 8:
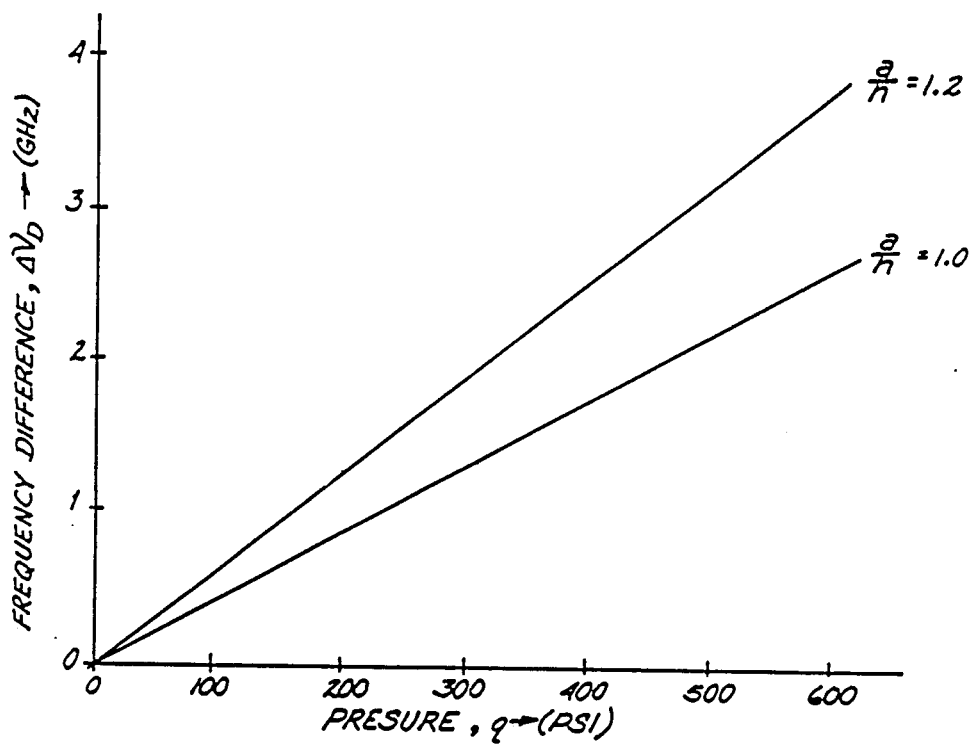
FIG. 8 shows induced frequency shift in the TE mode as a function of pressure.

FIG. 8 shows a plot of the difference in resonance frequencies as a function of pressure. Important features to note in FIG. 8 are that the frequency difference is substantially linear with pressure and that thick diaphragms can be used allowing substantial overpressures.

Figure 9:
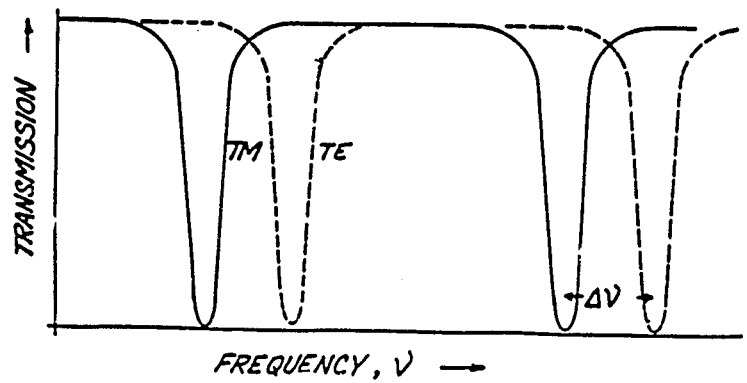
FIG. 9 is a graph of transmission as a function of frequency which shows a difference in resonant frequencies in the TE and TM modes as a result of applied pressure.

FIG. 9 is a graph of transmission from input 26A to output 28A of input/output waveguide 20A as a function of frequency for the TM and TE modes. Since stresses perpendicular to the plane of diaphragm 24A are negligible, the change in resonant frequency in the TM mode is zero. In the TE mode, on the other hand, the resonant frequency shift is a function of pressure. The frequency difference, therefore, is a function of pressure applied to diaphragm 24A. As pressure changes, the resonant frequency of the TM mode remains substantially constant, while the resonant frequency of the TE mode shifts, so that the difference in frequency changes as applied pressure changes.

Figure 10:
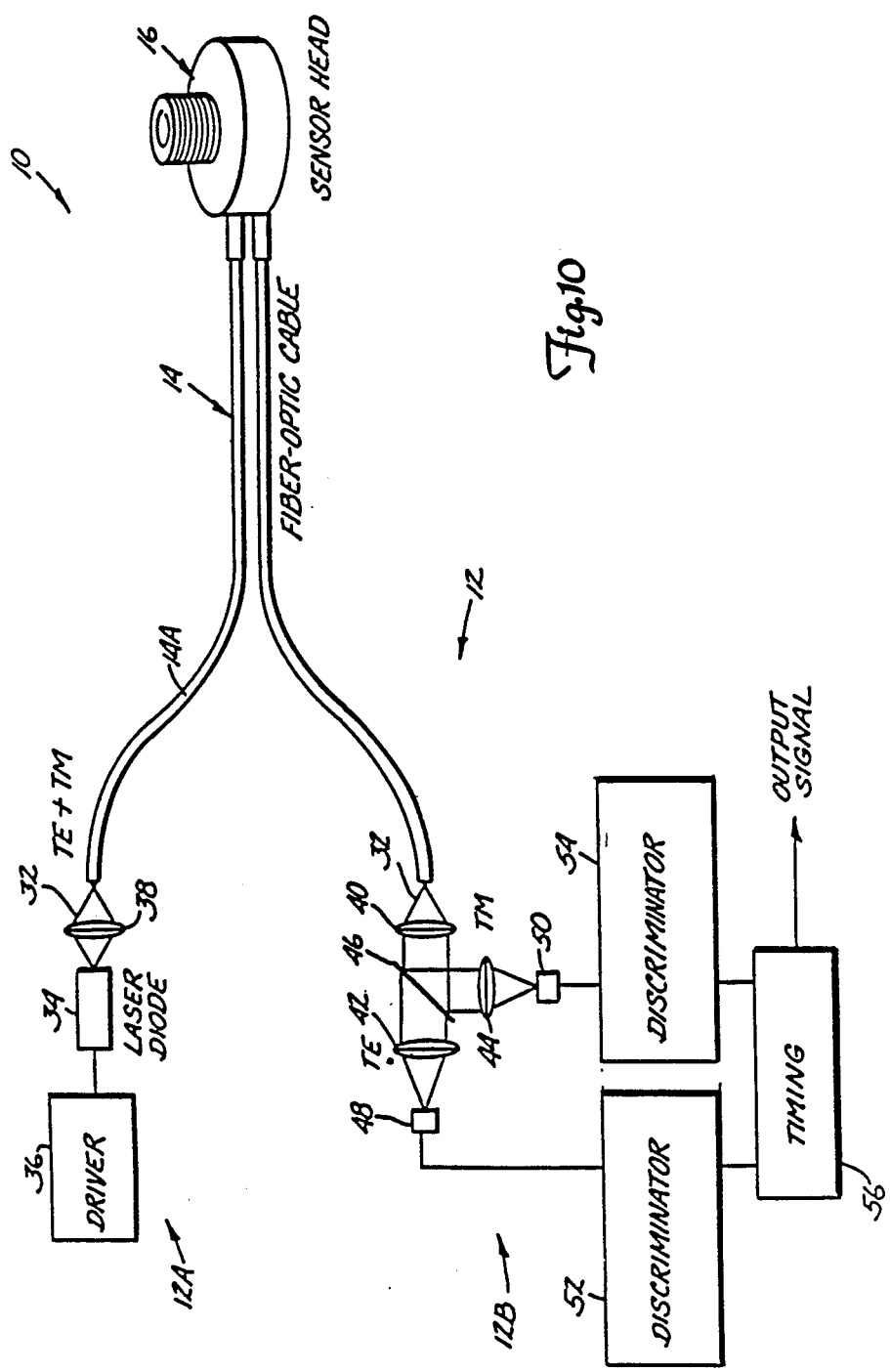
FIG. 10 is a block diagram of the pressure sensing optical sensor.

FIG. 10 is a block diagram illustrating a preferred embodiment of sensor 10 as it is used to sense pressure based upon differences in resonant frequencies between TM and TE modes. In this embodiment, light source/detector 12 includes a light source section 12A for producing a narrow bandwidth swept frequency light beam 32 and a detector section 12B for receiving light beam 32 and producing an output signal representative of pressure sensed by sensor head 16. Optical fiber 14A of fiber optic cable 14 guides light beam 32 from light source section 12A to sensor head 16, and optical fiber 14B guides light beam 32 from sensor head 16 back to detector section 12B.

The pressure sensor shown in FIG. 10 relies on the ability of ring resonator 22A and input/output waveguide 20A (shown in FIG. 5) and fiber optic cable 14 to maintain the vertically and horizontally polarized light of light beam 32 as separate modes. Ring resonator 22A is substantially polarization preserving. In order to maintain separate modes, optical fibers 14A and 14B are preferably polarization maintaining optical fibers.

Light source section 12A includes laser diode 34, driver 36, and lens 38 which operate together as a swept wavelength source. Laser diode 34 is preferably a CW single mode laser diode. Driver 36 repetitively applies a small current ramp to the bias current which drives laser diode 34, which causes the lasing frequency of laser diode 34 to be swept over several gigahertz. Ring resonator 22A (or other optical resonator as illustrated in FIGS. 12A-14B) is appropriately sized so that the span of lasing frequencies covers the complete free spectral range of ring resonator 22A. FIGS. 11A and 11B show the drive current applied to laser diode 34 and the output frequency of laser diode 34 as a function of time.

Detector section 12B includes lenses 40, 42 and 44, polarizing beam splitter 46, detectors 48 and 50, discriminators 52 and 54, and timing determination circuitry 56. Polarizing beam splitter 46 divides light beam 38 equally between the two orthogonal polarization modes (TM and TE). These two modes act independently, with the TM mode providing the reference signal, and the TE mode providing the sensing signal.

Lens 42 focuses the TE mode portion of light beam 32 onto detector 48, while lens 44 focuses the TM mode portion of light beam 32 onto detector 50. The output signals from detectors 48 and 50 are processed by discriminators 52 and 54 to produce a signal when resonance occurs in the TE and TM modes, respectively.

FIGS. 11C and 11D show the outputs from the reference (TM) resonator mode and the sensing (TE) resonator mode. As the output frequency of laser diode 34 is swept through the free spectral range, the reference and sensing resonator modes achieve resonance at different times depending upon the exact resonant frequencies for those modes. The time interval between resonance conditions is proportional to the pressure being measured. In order to remove the effect of small variations in sweep rate, timing determination circuit 56 preferably determines a ratio ($\Delta T/T$) of the measured time difference $\Delta T$ to the time interval T between successive resonances of the reference mode (corresponding to a sweep span of one free spectral range). The output of timing determination circuit 56 is a function of the pressure applied to sensor head 16.

By the use of sensing and reference modes, the effects of temperature on sensor head 16 are cancelled. As the temperature of sensor head 16 changes, the resonant frequencies of both the reference and the sensing resonator mode shift together up or down in frequency, since temperature changes both resonator modes equally. Since the resonance frequency of the sensing mode is always compared to that of the reference mode, temperature effects are automatically cancelled.

In another preferred embodiment of the present invention shown in FIGS. 12A and 12B, a cube 70 made of fused silica or other optical material is used as the basis of the optical resonator sensing device 18. The input light beam 14A and output light beam 14B are evanescently coupled to cube 70 via a prism 72. Whenever the frequency of the input light beam is such that the light beam path inside cube 70 is an integral number of wavelenghts in length, a resonance condition occurs causing a substantial portion of the input light beam to be absorbed into the cube 70. Consequently, at resonance there is a substantial decrease in the intensity of the output light beam compared to its intensity in the nonresonance condition. Force (e.g. produced by pressure to be sensed) applied to the cube 70 in a direction perpendicular to the plane of the light path inside the cube 70 causes a change in the index of refraction (due to the stress-optic effect) for light polarized parallel to the direction of force. Conversely, light polarized perpendicular to the direction of the applied force will experience no change of index of refraction. As the force is applied to cube 70, the resonant frequencies for light polarized parallel to the applied force will shift relative to the resonant frequencies for light polarized perpendicular to the direction of the applied force. Therefore, as in the case of optical ring resonator 22A, the two independent polarization modes may be used to accurately determine the magnitude of the force. Temperature effects are automatically cancelled out since changes in the refractive index of the cube 70 due to temperature equally affects the resonant frequencies of polarization modes but not the difference in their resonant frequencies. In this embodiment the method for determining the difference in resonant frequencies of the two polarization modes is substantially the same as in the case of optical ring resonator 22A described previously in conjunction with FIGS. 10 and 11A-11D.

In another preferred embodiment of the present invention shown in FIG. 13, a solid Fabry-Perot etalon is used as the basis of optical resonator sensing device 18. The etalon is composed of a plane, parallel plate 80 of fused silica or other optical material that has been optically polished on the parallel surfaces. High reflectivity, low loss coatings 82 and 84 deposited on the plane parallel surfaces form a solid Fabry-Perot etalon. The input light beam supplied through optical fiber 14A causes a resonance condition inside the optical resonator sensing device whenever the frequency of the input light beam is such that the optical thickness of the etalon is equal to an integral number of half wavelengths. In the present invention, force applied to the plate 80 in a direction perpendicular to the direction of the input light beam causes a change in the index of refraction of the etalon material for light polarized parallel to the applied force. The index of refraction for light polarized perpendicular to the applied force is unaffected. Therefore, as force is applied to plate 80, the resonant frequencies for light polarized parallel to the direction of the force are shifted relative to the resonant frequencies for light polarized perpendicular to the direction of applied force. The difference in resonant frequencies for the two polarization modes is used to measure the magnitude of the applied force. Temperature effects are automatically cancelled out since changes in the refractive index of the etalon material due to temperature affect both polarization modes equally. The resonant frequencies for the two polarization modes is read out in a manner substantially the same as that described previously. In this embodiment, occurrence of resonance produces an increase in intensity of the output light beam and a decrease in intensity of the intensity of light reflected back in the output beam 14A toward the light source. It is possible, therefore, to use the etalon of FIG. 13 in either a transmission or a reflection mode.

FIGS. 14A and 14B illustrate still another embodiment of the present invention in which sensing device 18 utilizes an integrated optic linear resonator. In the embodiment shown in FIG. 14A, the integrated optic linear resonator is a channel waveguide 90 formed on or in substrate 92. End surfaces 94 and 96 of substrate 92 are cut and polished to be parallel, and are coated with reflecting coatings 98 and 100, respectively. Optical fibers 14A and 14B are butt-coupled to reflective coatings 98 and 100 to direct the input beam into waveguide 90, and to couple the output beam out of channel 90, respectively. Force applied to waveguide 90 and substrate 92 in a direction perpendicular to the direction of propagation of the light beam in channel waveguide 90 causes a change in index of refraction for light polarized parallel to the applied force. The index of refraction for light polarized perpendicular to the applied force is unaffected. The device shown in FIG. 14A, therefore, operates in a manner similar to the solid plate etalon resonator shown in FIG. 13. The difference in resonant frequencies caused by the applied force is read out using the frequency swept light beam, and the difference in time between resonances of the two polarization modes is a function of the applied force. As in the case of the solid plate etalon resonator shown in FIG. 13, the device shown in FIG. 14A can operate in either a transmission or a reflection mode.

The embodiment of sensing device 18 shown in FIG. 14B is generally similar to the embodiment shown in FIG. 14A. Channel waveguide 110 is formed in substrate 112. In this embodiment, however, the reflectors which define the cavity are distributed Bragg reflectors 114 and 116. Force applied to waveguide 110 in a direction perpendicuar to the direction of propagation of the light beam in waveguide 110 causes changes in index of refraction for light polarized parallel to the applied force, but not light polarized perpendicular to the direction of the applied force. The difference in indices of refraction due to applied force causes a difference in resonant frequencies for the two polarization modes, which is used to measure the magnitude of the applied force.

Temperature Sensors

All of the optical resonators shown in FIGS. 5, 12A and 12B, 13, 14A and 14B can be used for temperature sensing as well as pressure or force sensing. To make a temperature sensor, the optical resonator sensing device 18 is designed so that the index of refraction for one polarization mode changes relative to that for the other polarization mode as a function of temperature. For example, in the cube resonator of FIGS. 12A and 12B and the solid plate etalon resonator of FIG. 13, this characteristic is accomplished by making the resonators out of crystal quartz or other similar birefringent material. For crystal quartz, for example, the change in index of refraction of the ordinary ray is $-0.574 \times 10^{-5}/°C.$, while the change in index of refraction for the extraordinary ray is $-0.651 \times 10^{-5}/°C.$ The resulting difference in frequency shift of the two polarization modes is 0.376 GHz/°C. Thus, as the temperature of the resonator changes, the difference in resonant frequencies between two polarization modes changes by 0.376 GHz/°C.

This same concept can be used with the integrated optic linear and ring resonators. In these resonators, the effective index of refraction of each polarization mode depends on the dimensions and material properties of the channel waveguides. By properly designing the channel waveguide that forms the optical ring resonator or linear resonator, the effective index of refraction for the TE mode will have a different temperature coefficient than the effective index of refraction of the TM mode (see "Temperature Independent Thin Film Optical Waveguide", S. L. Chen and J. T. Boyd, Apl. Opt., 20, 2280, (1 July 1981)). As the temperature of sensing device 18 changes, therefore, the resonant frequencies of the TE mode will shift relative to those of the TM mode. The difference in resonant frequencies is read out in the manner described with reference to FIGS. 10 and 11A–11D.

Another embodiment of a temperature sensor uses temperature induced stress differences to create stress induced birefringence. In this embodiment, the operation of the temperature sensor is similar to the pressure sensor described previously. The optical resonator used in the temperature sensor is constrained in the one direction so that temperature induces stress which, in turn, causes a change in the index of refraction for the TE mode. The optical resonator is not constrained in the direction perpendicular to the surface of the substrate, so that essentially no stress is induced in the direction perpendicular to the plane of the substrate. As a result, no change occurs in the index of refraction for the TM mode. The difference in resonant frequencies for the TE and TM modes is a function of temperature.

Figure 15:
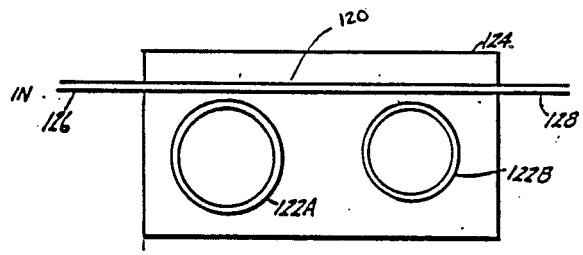
FIG. 15 shows an embodiment of a temperature sensing optical sensor using a pair of optical ring resonators.

FIG. 15 shows another temperature sensor of the present invention which includes input/output waveguide 120, and a pair of ring resonators 122A and 122B which are fabricated on or in substrate 124. A narrow bandwidth swept frequency light beam is guided by input/output waveguide 120 from its input end 126 to its output end 128. Ring resonators 122A and 122B are each evanescently coupled to input/output waveguide 120, but differ slightly in size. For example, the perimeter of ring resonator 122A is slightly larger than the perimeter of ring resonator 122B.

Figure 16:
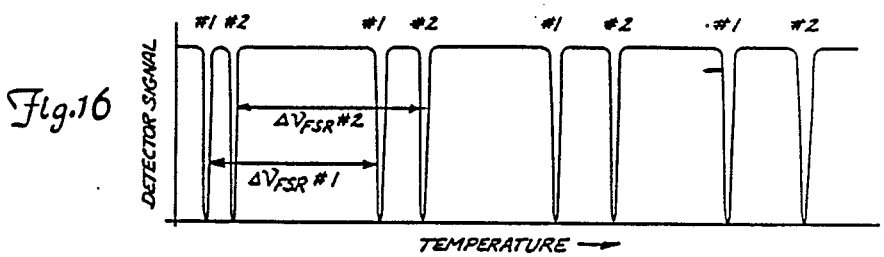
FIG. 16 is a graph of transmission as a function of temperature for the sensor of FIG. 15.

Since the ring resonators 122A and 122B have slightly different perimeters, their free spectral ranges are different. This is illustrated in FIG. 16, which is a graph of transmission of a single frequency light beam as a function of temperature. The resonances associated with ring resonator 122A are labeled "#1", and the resonances due to ring resonator 122B are labeled "#2" in FIG. 16.

Figure 17:
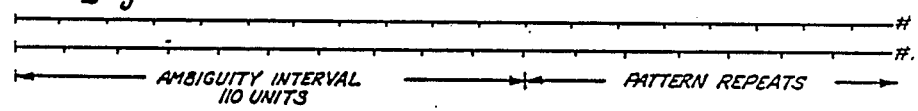
FIG. 17 is a graph illustrating a temperature ambiguity interval.

Because the free spectral ranges of ring resonators 122A and 122B are different, the separation between resonance #1 and resonance #2 changed with temperature. This allows determination of absolute temperature, at least within the ambiguity interval of temperature. This temperature ambiguity interval arises because the pattern of resonances shown in FIG. 16 repeats every X degrees, where X is determined by how close the free spectral ranges of ring resonators 122A and 122B are to each other in value. This is illustrated in FIG. 17.

The particular temperature range to be sensed determines the ambiguity interval and, in turn, the size of ring resonators 122A and 122 can be determined. For example, if the sensor requires an ambiguity interval of about 500° C., this can be achieved by selecting resonator 122A so that it goes through a resonance every 22° C. and resonator 122B so that it goes through a resonance every 23° C. This yields an ambiguity interval of 506° C. Assuming a fused quartz construction, ring resonators 122A and 122B have a thermal expansion coefficient of $5.5 \times 10^{-7}/°C.$; an index of refraction $N = 1.46$ (at 660 nm) and exhibit a change in index of refraction with temperature of $9.9 \times 10^{-10}/°C.$ (at 660 nm). Therefore:

$$\Delta p/p = 5.5 \times 10^{-5}/100° \text{ C.} \qquad \text{Eq 13A}$$

$$\Delta N/N = 6.8 \times 10^{-4}/100° \text{ C.} \qquad \text{Eq 13B}$$

$$\Delta p/p + \Delta N/N = 7.3 \times 10^{-4}/100° \text{ C.} \qquad \text{Eq 13C}$$

From Equation 7, the frequency shift (at a wavelength of 850 nm) due to temperature is:

$$\begin{aligned}\Delta \nu &= (3 \times 10^8)(7.3 \times 10^{-4}/100° \text{ C.})/(0.85 \times 10^{-6} \text{ m}) \\ &= 258 \text{ GHz}/100° \text{ C.}\end{aligned} \quad \text{Eq. 14}$$

The free spectral range of resonator 22B is:

$$\Delta \nu_1 = (22° \text{ C.})(258 \text{ GHz } 100° \text{ C.}) = 56.8 \text{ GHZ} \qquad \text{Eq. 15A}$$

$$\Delta \nu_2 = (23° \text{ C.})(258 \text{ GHz } 100° \text{ C.}) = 59.3 \text{ GHZ} \qquad \text{Eq. 15B}$$

Solving for perimeters $p_1$ and $p_1$ of ring resonators 122A and 122B, respectively:

$$\begin{aligned}p_1 &= C/N\Delta\nu_1 \\ &= (3 \times 10^8 \text{ m/sec})/(1.46)(56.8 \times 10^9 \text{ sec}^{-1}) \\ &= 3.62 \text{ mm}\end{aligned} \quad \text{Eq. 16A}$$

$$\begin{aligned}p_2 &= C/N\Delta\nu_2 \\ &= (3 \times 10^8 \text{ m/sec})/(1.46)(59.3 \times 10^9 \text{ sec}^{-1}) \\ &= 3.47 \text{ mm}\end{aligned} \quad \text{Eq. 16B}$$

The corresponding radii are $r_1 = 0.58$ mm for ring resonator 122A and $r_2 = 0.55$ mm for ring resonator 122B.

Figure 18:
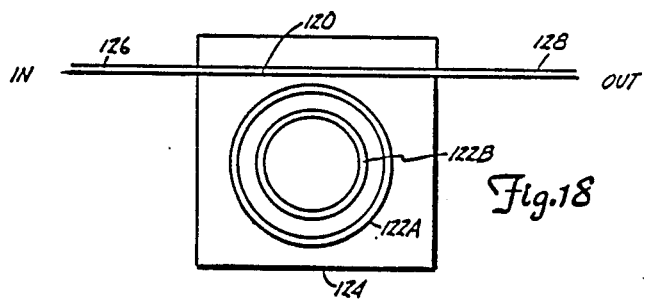
FIG. 18 shows another embodiment of a temperature sensing optical sensor of the present invention.

FIG. 18 shows a variation in the construction of a temperature sensor in which rings 122A and 122B are concentric. Evanescent coupling occurs between input-/output waveguide 120 and ring resonator 122A and also between ring resonators 122A and 122B.

Figure 19:
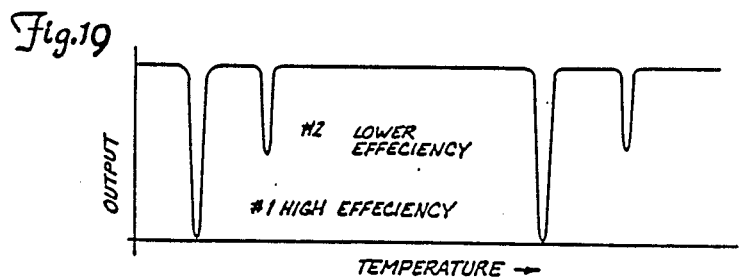
FIG. 19 is a graph of transmission as a function of temperature for the optical sensor of FIG. 18.

By adjusting the waveguide parameters of ring resonators 122A and 122B so that one of the ring resonators (for example, resonator 122A) has a high efficiency while the other other ring resonator 122B has a lower efficiency, the resonant conditions of the two resonators can clearly be distinguished, as shown in FIG. 19.

Figure 20:
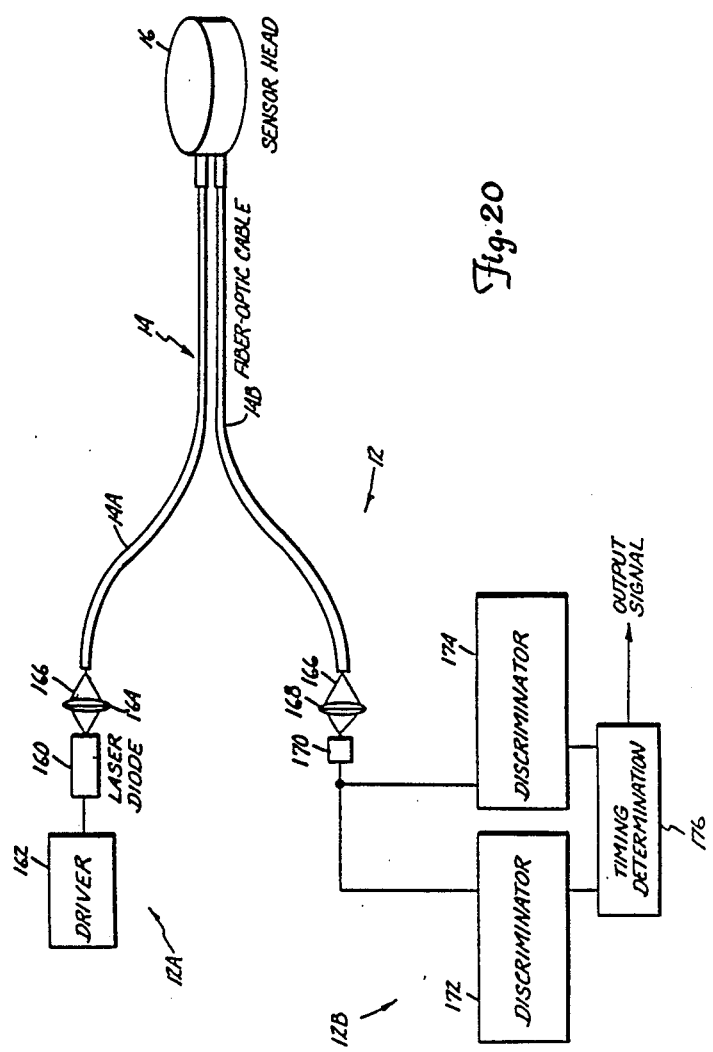
FIG. 20 is a block diagram of the temperature sensing optical sensor of FIG. 16.

FIG. 20 shows a block diagram of a temperature sensor which produces an output signal based upon temperature sensed by a temperature device of the type shown in FIGS. 15 or 18. This embodiment is generally similar to the embodiment shown in FIG. 10 for a pressure sensor, but does not require the separation of the light beam into two separate polarization modes.

In FIG. 20, light source section 12A includes laser diode 160, driver 162, and lens 164 which produce light beam 166 which is swept over the free spectral range of the resonances produced by sensor head 16. Light beam 166 is supplied from light source section 12A through optical fiber 14A to sensor head 16, and then is transmitted from sensor head 116 to detector section 12B by optical fiber 14B.

Detector section 12B includes lens 168, detector 170, discriminators 172 and 174, and timing determination circuit 176. Discriminators 172 and 174 are set to detect resonances at different levels, so that discriminator 172 produces an output when the first resonance (corresponding to ring resonator 122A) occurs, while discriminator 174 produces an output when the second resonance (corresponding to ring resonator 122B) occurs. Timing determination circuit 176 produces an output signal representative of temperature based upon the time difference between the output signals from discriminators 172 and 174. As in the embodiment shown in FIG. 10, timing determination circuit 176 compensates for variations in the drive supplied to laser diode 160 by ratioing the time difference $\Delta T$ between the otuput signals of discriminators 172 and 174 with the sweep time T which is determined by measuring successive output signals from either discriminator 172 or discriminator 174.

Conclusion

The optical sensors of the present invention are simple in structure, yet provide extremely high accuracy. Because the present invention does not rely upon intensity coding, but rather utilizes wavelength coding, losses in connectors and in the fiber optic cables do not affect the accuracy of measurement of the parameter being sensed.

Although the present invention has been described with reference to preferred embodiments, workers skilled in the art will recognize that changes may be made in form and detail without departing from the spirit and scope of the invention.

What is claimed is:

1. An optical sensor system for providing an output signal representative of a sensed parameter, the optical sensor system comprising:
    optical waveguide means for guiding a light beam, the optical waveguide means having an input and an output;
    optical resonator means optically coupled to the optical waveguide means between the input and the output, the optical resonator means defining first and second resonant cavities which exhibit first and second sets of resonant frequencies, respectively; the first and second cavities having characteristics which are affected differently by changes in the parameter and which cause the first and second sets of resonant frequencies to vary differently in response to changes in the parameter, whereby a differential frequency shift occurs between resonant frequencies of the first and second sets which is a function of the parameter;

means for providing a light beam to the input which has a frequency which varies with time through a frequency range which includes at least one resonant frequency of each of the first and second sets; and means responsive to the light beam from the output for providing the output signal as a function of a difference between resonant frequencies of the first and second sets.

2. The optical sensor system of claim 1 wherein the means responsive to the light beam provides the output signal as a function of a time difference between occurrence of resonant frequencies of the first and second sets.

3. The optical sensor system of claim 2 wherein the means for providing a light beam periodically varies the frequency of the light beam with time through the frequency range.

4. The optical sensor system of claim 3 wherein the means responsive to the light beam produces the output signal as a function of time between occurrences of resonant frequencies of the first and second sets and time between successive occurrences of the resonant frequencies of the first set.

5. The optical sensor system of claim 2 wherein the means responsive to the light beam comprises:

means for providing a first signal when an extremum in light intensity of the light beam corresponding to a resonant frequency of the first set occurs;

means for providing a second signal when an extremum in light intensity of the light beam corresponding to a second frequency of the second set occurs; and means for providing the output signal as a function of the first and second signals.

6. The optical sensor system of claim 1 wherein the means for providing a light beam causes the light beam to contain portions having a first polarization and second polarization, wherein the optical resonator means has an effective birefringence which varies as a function of the parameter so that the optical resonator means exhibits the first and second sets of resonant frequencies for the portions of the light beam having the first and the second polarization, respectively, and wherein a difference between the resonant frequencies of the first and second sets is a function of the effective birefringence of the optical resonator means.

7. The optical sensor system of claim 6 wherein the optical resonator means comprises:

an optical ring resonator; and a substrate for supporting the optical ring resonator.

8. The optical sensor system of claim 7 wherein the substrate is a diaphragm.

9. The optical sensor system of claim 8 and further comprising:

support means for supporting the diaphgram at an outer edge.

10. The optical sensor system of claim 9 wherein the first polarization corresponds to a TE polarization mode, and wherein the second polarization corresponds to a TM polarization mode.

11. The optical sensor system of claim 6 wherein the means responsive to the light beam comprises:

means for separating the light beam into a first beam having the first polarization and a second beam having the second polarization;

means for providing a first signal in response to a change in intensity of the first beam corresponding to an occurrence of resonance;

means for providing a second signal in response to a change in intensity of the second beam corresponding to an occurrence of resonance; and means for providing the output signal as a function of a time difference between occurrence of the first and second signals.

12. The optical sensor system of claim 1 wherein the optical resonator means comprises:

a first ring resonator having a first perimeter and exhibiting the first set of resonant frequencies; and a second ring resonator having a second, different perimeter and exhibiting the second set of resonant frequencies.

13. The optical sensor system of claim 12 and further comprising a substrate for supporting the first and second ring resonators proximate one another.

14. The optical sensor system of claim 13 wherein the first and second ring resonators are concentrically arranged.

15. The optical sensor system of claim 12 wherein the first and second ring resonators have different efficiencies so that intensity of the light beam at the output decreases by different amounts when resonant frequencies of the first and second sets occur.

16. The optical sensor system of claim 15 wherein the means responsive to the light beam comprises:

means for providing a first signal when the light beam exhibits a decrease in intensity at the output corresponding to occurrence of a resonant frequency of the first set;

means for providing a second signal when the light beam exhibits a decrease in intensity at the output corresponding to occurrence of a resonant frequency of the second set; and means for providing the output signals as a function of a time difference between occurrence of the first and second signals.

17. The optical sensor system of claim 1 wherein the optical resonator means comprises an optical cube resonator.

18. The optical sensor system of claim 1 wherein the optical resonator means comprises a solid plate etalon resonator.

19. The optical sensor system of claim 1 wherein the optical resonator means comprises an integrated optic linear resonator.

20. The optical sensor system of claim 1 wherein the optical resonator means comprises an integrated optic ring resonator.

21. An optical sensor system for providing an output signal representative of a sensed parameter, the optical sensor comprising:

light source means for providing a light beam having a frequency which varies with time through a frequency range;

waveguide means for guiding the light beam between an input and an output;

first optical resonator means coupled to the waveguide means between the input and the output for exhibiting a first resonant condition in which a portion of the light beam is absorbed when the light beam has one of a first set of resonant frequencies;

second optical resonator means for exhibiting a second resonant condition in which a portion of the light beam is absorbed when the light beam has one of a second set of resonant frequencies, where the first and second optical resonator means have characteristics which are affected differently by the changes in the parameter which cause the first set and second sets to vary differently in response to a change in the parameter so that a difference between the resonant frequencies of the first and second sets of resonant frequencies varies as a function of the parameters; and means for receiving the light beam from the output and providing the signal as a function of the difference between the resonant frequencies of the first and second sets.

22. The optical sensor system of claim 21 wherein the means for receiving the light beam comprises:

means for producing a first signal indicative of occurrence of the first resonant condition;

means for producing a second signal indicative of occurrence of the second resonant condition; and means for providing the output signal as a function of a time difference between occurrence of the first and second output signals.

23. The optical sensor system of claim 21 wherein the first and second resonator means comprise:

a substrate; and an optical ring resonator supported by the substrate, the optical ring resonator having an effective birefringence which varies as a function of the parameter, so that the optical ring resonator exhibits the first resonant condition for a first polarization of the light beam and exhibits the second resonant condition for a second polarization of the light beam.

24. The optical sensor system of claim 23 wherein the substrate is a pressure responsive diaphragm.

25. The optical sensor system of claim 24 and further comprising:

support means for supporting the diaphragm at an outer edge of the diaphragm.

26. The optical sensor system of claim 21 wherein the first and second optical resonator means are first and second optical ring resonators having first and second different perimeters, respectively.

27. The optical sensor system of claim 21 wherein the light beam has first and second polarization components, and wherein the first and second optical resonator means comprise an optical cube resonator which exhibits first and second indices of refraction which vary differently as a function of the sensed parameter.

28. The optical sensor system of claim 21 wherein the light beam has first and second polarization components, and wherein the first and second optical resonator means comprise a solid plate etalon resonator which exhibits first and second indices of refraction which vary differently as a function of the sensed parameter.

29. The optical sensor system of claim 21 wherein the light beam has first and second polarization components, and wherein the first and second optical resonator means comprise an integrated optic linear resonator which exhibits first and second effective indices of refraction which vary differently as a function of the sensed parameter.

30. An optical sensor system for providing an output signal representative of a parameter, the optical sensor comprising:

a variable frequency light source for providing a light beam which periodically varies in frequency within a frequency range in a predetermined manner with time;

optical resonator means defining first and second resonant cavities for exhibiting first and second sets of resonant frequencies, respectively, the first and second resonant cavities having characteristics which are affected differently by changes in the parameter and which cause the first and second sets of resonant frequencies to vary differently as a function of the parameter, whereby a differential frequency shift occurs between resonant frequencies of the first and second sets which is a function of the parameter;

input/output waveguide means for guiding the light beam from an input to an output, the input/output waveguide means being coupled to the optical resonator means so that intensity of the light beam at the output changes when the light beam has a resonant frequency of the first set and when the light beam has a resonant frequency of the second set; and output means responsive to changes in intensity of the light beam at the output for providing the output signal as a function of a time difference between occurrence of the resonant frequencies of the first and second sets.

31. An optical sensor for sensing a parameter, the optical sensor comprising:

optical resonator means defining first and second resonant cavities for exhibiting first and second sets of resonant frequencies, respectively, the first and second resonant cavities having characteristics which are affected differently by changes in the parameter and which cause the first and second sets of resonant frequencies to vary differently as a function of the parameter, whereby a differential frequency shift occurs between resonant frequencies of the first and second sets which is a function of the parameter;

input/output waveguide means for guiding a light beam from an input to an output, the input/output waveguide means being coupled to the optical resonator means so that intensity of the light beam at the output changes when the light beam has a frequency approximately equal to a resonant frequency of the first set and when the light beam has a frequency approximately equal to a resonant frequency of the second set; and output means responsive to changes in intensity of the light beam at the output for providing an output signal representative of the parameter based upon a difference in the resonant frequencies of the first and second set.

32. The optical sensor of claim 31 wherein the optical resonator means has an effective birefringence which varies as a function of the parameter so that the optical resonator means exhibits the first and second sets of resonant frequencies for first and second polarization components of the light beam, respectively, and wherein a difference between resonant frequencies of the first and second sets is a function of the effective birefringence of the optical resonator means.

33. The optical sensor of claim 32 wherein the optical resonator means comprises:

an optical ring resonator; and a substrate for supporting the optical ring resonator.

34. The optical sensor of claim 33 wherein the substrate is a diaphragm.

35. The optical sensor system of claim 34 and further comprising:
support means for supporting the diaphragm at an outer edge.

36. The optical sensor of claim 31 wherein the optical resonator means comprises:
a first optical ring resonator having a first perimeter and exhibiting the first set of resonant frequencies; and
a second optical ring resonator having a second, different perimeter and exhibiting the second set of resonant frequencies.

37. The optical sensor of claim 36 and further comprising a substrate for supporting the first and second optical ring resonators proximate one another.

38. The optical sensor of claim 37 wherein the first and second optical ring resonators are concentrically arranged.

39. The optical sensor of claim 36 wherein the first and second optical ring resonators have different efficiencies so that intensity of the light beam at the output decreases by different amounts when resonant frequencies of the first and second sets occur.

40. The optical sensor of claim 31 wherein the optical resonator means comprises an optical cube resonator.

41. The optical sensor of claim 31 wherein the optical resonator means comprises a solid plate etalon resonator.

42. The optical sensor of claim 31 wherein the optical resonator means comprises an integrated optic linear resonator.

43. The optical sensor of claim 31 wherein the optical resonator means comprises an integrated optic ring resonator.

44. A pressure monitor, comprising:
pressure responsive means including a diaphragm having a waveguide loop located on one surface thereof, said diaphragm deflecting under pressure to cause stress-induced birefringence in said waveguide loop; the waveguide loop defining first and second resonant cavities exhibiting first and second sets of resonant frequencies which vary depending on the amount of stress-induced birefringence in said waveguide loop;
optical input means positioned adjacent said waveguide loop for coupling light energy into said waveguide loop;
output means also positioned adjacent said waveguide loop for coupling a portion of light energy out of said waveguide loop; and
whereby a differential frequency shift between resonant frequencies of the first and second sets occurs in the spectral response of light energy resonating in said first and second resonant cavities of said waveguide loop as a result of said stress-induced birefringence which is proportional to pressure acting on said diaphragm.

45. A pressure monitor according to claim 44, wherein said input means includes an input waveguide formed along said one surface of said pressure responsive means, and wherein said input waveguide has a point which is tangentially located with said waveguide loop through which optical energy is coupled into said waveguide loop.

46. A pressure monitor according to claim 44, wherein said output means further includes an output waveguide formed along said one surface of said pressure responsive means, and includes a point tangentially located with respect to said waveguide loop through which a portion of optical energy therein is coupled out of said waveguide loop.

47. A pressure monitor according to claim 44, wherein said pressure responsive means includes a rigid rim portion which rigidly holds the cicumference of said diaphragm.

48. A pressure measuring system comprising:
pressure responsive means including a diaphragm having a waveguide loop located on one surface thereof, said diaphragm causing a stress-induced birefringence in said waveguide loop in response to pressure acting on a surface thereof; the waveguide loop defining first and second resonant cavities exhibiting first and second sets of resonant frequencies which vary depending on the amount of stress-induced birefringence in said waveguide loop;
source means positioned to couple optical energy into said waveguide loop; and
frequency detector means positioned to receive light energy coupled out of said waveguide loop; and
whereby a differential frequency shift between resonant frequencies of the first and second sets occurs in the spectral response of light energy resonating in said first and second resonant cavities of said waveguide loop as a result of said stress-induced birefringence which is proportional to pressure acting on said diaphragm.

49. An optical sensor for sensing a parameter, the optical sensor comprising:
optical resonator means defining first and second resonant cavities for exhibiting first and second sets of resonant frequencies, respectively, the first and second cavities having characteristics which are affected differently by changes in the parameter and which cause the first and second sets of resonant frequencies to vary differently as a function of the parameter, whereby a differential frequency shift occurs between resonant frequencies of the first and second sets which is a function of the parameter;
means for coupling light energy into the optical resonator means; and
means responsive to light energy coupled out of the optical resonator means for providing an output signal representative of the parameter based upon the differential frequency shift.

50. The optical sensor of claim 49 wherein the optical resonator means comprises:
an optical ring resonator; and
a substrate for supporting the optical ring resonator.

51. The optical sensor of claim 50 wherein the parameter is pressure and the substrate is a diaphragm.

52. The optical sensor system of claim 51 and further comprising:
support means for supporting the diaphragm at an outer edge.

53. The optical sensor of claim 49 wherein the optical resonator means has an effective birefringence which varies as a function of the parameter so that the optical resonator means exhibits the first and second sets of resonant frequencies for the portions of the light energy having the first and the second polarization, respectively, and wherein the differential frequency shift is a function of the effective birefringence of the optical resonator means.

* * * * *

UNITED STATES PATENT AND TRADEMARK OFFICE
CERTIFICATE OF CORRECTION

PATENT NO. : 4,775,214
DATED : October 4, 1988
INVENTOR(S) : Lawrence A. Johnson It is certified that error appears in the above-identified patent and that said Letters Patent is hereby corrected as shown below:

Column 5, Line 42, delete "The terms of," and insert -- In terms of --.

Column 5, Line 56, after "optical" insert "ring"

Column 5, Line 63, delete "Hasvisto" and insert "Haavisto"

Column 6, Eq7, delete -c and insert (-c)

Column 6, Line 44, delete first occurrence of "is"

Column 7, Line 41, delete first occurrence of "optical"

Column 8, Line 17, delete "negligable" and insert "negligible"

Column 12, Line 11, delete second occurrence of "of" and insert "for"

Column 13, Line 5, delete "changed" and insert "changes"

Column 13, Line 16, delete 122 and insert 122B

Column 14, Line 65, delete "characeteristics" and insert "characteristics"

Column 15, Line 60, delete "diaphgram" and insert "diaphragm"

UNITED STATES PATENT AND TRADEMARK OFFICE
CERTIFICATE OF CORRECTION

PATENT NO. : 4,775,214

DATED : October 4, 1988

INVENTOR(S) : Lawrence A. Johnson

It is certified that error appears in the above-identified patent and that said Letters Patent is hereby corrected as shown below:

Column 20, line 7, delete "cicumference" and insert -- circumference --.

Signed and Sealed this

Fourth Day of July, 1989

*Attest:*

DONALD J. QUIGG

*Attesting Officer*     *Commissioner of Patents and Trademarks*